United States Patent
Masaki et al.

(10) Patent No.: US 7,963,741 B2
(45) Date of Patent: Jun. 21, 2011

(54) MOTOR AND FAN DEVICE USING THE SAME

(75) Inventors: Ryoso Masaki, Narashino (JP); Yuji Enomoto, Hitachi (JP); Motoya Ito, Hitachinaka (JP); Hisato Amano, Hitachi (JP); Shigeki Morinaga, Yachiyo (JP); Katsuyuki Yamazaki, Chiba (JP); Kazuhide Ebine, Narashino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 897 days.

(21) Appl. No.: 11/838,309

(22) Filed: Aug. 14, 2007

(65) Prior Publication Data

US 2008/0069686 A1 Mar. 20, 2008

(30) Foreign Application Priority Data

Sep. 20, 2006 (JP) ................. 2006-253720

(51) Int. Cl.
 *F04D 29/70* (2006.01)
(52) U.S. Cl. ......................... 415/121.2; 416/5
(58) Field of Classification Search ............... 415/121.2; 416/5; 310/257
See application file for complete search history.

(56) References Cited

U.S. PATENT DOCUMENTS

| | | | | |
|---|---|---|---|---|
| 5,773,910 A | * | 6/1998 | Lange | 310/266 |
| 6,157,111 A | | 12/2000 | Asao | |
| 6,492,758 B1 | * | 12/2002 | Gianni et al. | 310/257 |
| 2002/0070627 A1 | | 6/2002 | Ward et al. | |

FOREIGN PATENT DOCUMENTS

| | | |
|---|---|---|
| CN | 10955226 C | 4/2002 |
| CN | 1610223 A | 4/2005 |
| DE | 20115258 U1 | 9/2001 |
| DE | 20115258 U1 | 9/2004 |
| GB | 2378047 | 1/2003 |
| JP | 2001-161054 | 6/2001 |
| JP | 2003-513599 | 4/2003 |
| WO | WO 01/31766 A1 | 5/2001 |
| WO | WO2004/008605 | 1/2004 |

OTHER PUBLICATIONS

Office Action in CN 200710146506.3—dated Sep. 11, 2009; (6 pgs., in Chinese); English language translation (3 pgs).
Office Action in German Patent Appln. 10 2007 038 416.7-32, dated Feb. 22, 2011; includes English language translation.

* cited by examiner

*Primary Examiner* — Igor Kershteyn
(74) *Attorney, Agent, or Firm* — Antonelli, Terry, Stout & Kraus, LLP.

(57) ABSTRACT

The present invention provides a motor which includes a stator including a plurality of one-phase stators composed of a pair of stator cores having claw-type teeth and a coil for generating magnetic flux at the claw-type teeth, and a rotor for generating torque at a rotary shaft, wherein the stator core includes a plurality of split cores having the same shape, and the split cores are formed to have a recessed portion and a projected portion to be fitted in the recessed portion. Thereby, by using a plurality of the split cores having the same shape, one stator core is formed. On this occasion, the shape of the split cores is molded so that the recessed portion and the projected portion of one stator core are disposed at positions at which those are fitted to the projected portion and the recessed portion of the opposing stator core, respectively.

13 Claims, 14 Drawing Sheets

MOTOR AND FAN DEVICE USING THE SAME

CROSS REFERENCES TO RELATED APPLICATION

The present application claims priority from Japanese application JP 2006-253720 filed on Sep. 20, 2006, the content of which is hereby incorporated by reference into this application.

BACKGROUND OF THE INVENTION

1. Field of the Invention

The present invention relates to an art of providing a motor.

2. Description of Related Art

Motors are widely used in various fields. As one form of the motors, there is a motor having a claw-type magnetic pole. For example, JP-A-2001-161054 and JP-A-2003-513599 disclose the structure thereof.

First, in JP-A-2001-161054, a stator for one phase of the motor is composed of a circular coil through which current passes, a pair of claw-type magnetic poles, and a magnetic body surrounding the coil to form a magnetic path together with the claw-type magnetic poles.

In the case of a three-phase motor, its stator can be formed by using three sets of the above described stators. When three-phase voltage is applied to the three sets of the stators, rotational torque is generated in a rotor to which a permanent magnet is fixed, so that the rotor is rotated. This motor is characterized in that there is not a coil end and thus reduction in size of the motor can be achieved, as compared with a conventional motor.

Further, JP-A-2003-513599 discloses that a three-phase motor is constructed, for example, by providing one set of stators with coils for three phases so that the motor has a thin structure, rather than by superposing three sets of the stators each for one phase on one another as disclosed in JP-A-2001-161054.

Incidentally, in a reference example shown in FIG. 17, a magnetic path for one phase of a stator is formed by combining stator cores 81 and 83 having claw-type teeth so as to be opposed to each other. A coil 82 is build into an inner space formed by combining the stator cores 81 and 83 to constitute a one-phase stator. As shown in FIG. 11, similar one-phase stators 85 and 86 are superposed on this one-phase stator 80 to form a three-phase stator, and a rotor is combined therewith to constitute a three-phase motor 100. A method of integrally molding a stator core having such claw-type magnetic poles out of a magnetic powder material using a pressing machine is characterized in that a three-dimensional shape can be easily molded.

The motor in which the stator is configured to have the claw-type magnetic poles by molding those out of such a magnetic powder material has the following problem. In order to obtain desired performance by integrally molding the stator core out of the magnetic powder material, it is necessary to make the mass density of the stator core high. For this purpose, it is required to use a pressing machine with large compression force for the integral molding. Particularly, there is a limit in integrally molding a large output motor in view of the performance of the pressing machine.

Thus, in order to construct the large output motor using the magnetic powder material, it is necessary to integrally mold split cores into which the stator core is split, and thereafter use the plurality of split cores to assemble the stator. Since assembling accuracy of this stator influences the motor characteristics, it is a problem to enhance the assembling accuracy of the stator core. Further, also in the case of forming the stator cores for one phase by opposing the two stator cores to each other, it becomes a problem to enhance the assembling accuracy.

BRIEF SUMMARY OF THE INVENTION

To solve the above described problems, the following measures are taken.

In a motor which includes a stator including a plurality of one-phase stators configured by a pair of stator cores having claw-type teeth and a coil for generating magnetic flux at the claw-type teeth, and a rotor for generating torque at a rotary shaft, the stator core includes a plurality of split cores having the same shape, and the split cores have a structure in which the split core is provided with a recessed portion and a projected portion to be fitted to the recessed portion. Thereby, by using the plurality of split cores having the same shape, one stator core is formed. By using the two stator cores as a pair, and assembling those so as to be opposed to each other while putting a coil therebetween, a one-phase stator is made. On this occasion, the shape of the split core is molded so that the recessed portions and the projected portions of one stator core are disposed in the positions where those are fitted to the projected portions and the recessed portions of the opposed stator core, respectively. Thereby, the stator can be easily assembled with high accurately. Particularly if the respective projected portions and the recessed portions have such shapes that those are fitted to each other when one split core of the stator core are laid on the other split core of the stator core in an alternate brick laying state, the strength of the stator can be improved.

Further, in a motor which includes a rotor rotating around a rotary shaft, and a stator formed by causing a plurality of stator cores to oppose to each other which stator cores have columnar core portions in which a plurality of coils disposed on the same plane around the rotary shaft are inserted and claw-type teeth, the stator core has a structure in which the stator core includes a recessed portion at least in one of the columnar core portions, and is provided with a projected portion at least in one of the columnar cores which projected portion is fitted in the recessed portion. In the columnar core portions of the opposing stator cores, the recessed portion is fitted to the projected portion, and the projected portion is fitted in the recessed portion, so that fixing strength and assembling accuracy are improved.

According to the above described constitution, it is possible to improve facility of assembly and assembling accuracy of the stator by molding the shape of the split cores.

Further, if the motor having the above described constitution is used in a fan device for example, it is possible to provide a fan device which is reduced in thickness for example, as compared with a conventional fan device.

According to the present invention, it is possible to provide a motor enhanced in reliability as compared with a conventional motor, and a fan device using it.

Other objects, features and advantages of the invention will become apparent from the following description of the embodiments of the invention taken in conjunction with the accompanying drawings.

DETAILED DESCRIPTION OF THE INVENTION

Hereinafter, embodiments of the present invention will be described by using the drawings.

Figure 1:
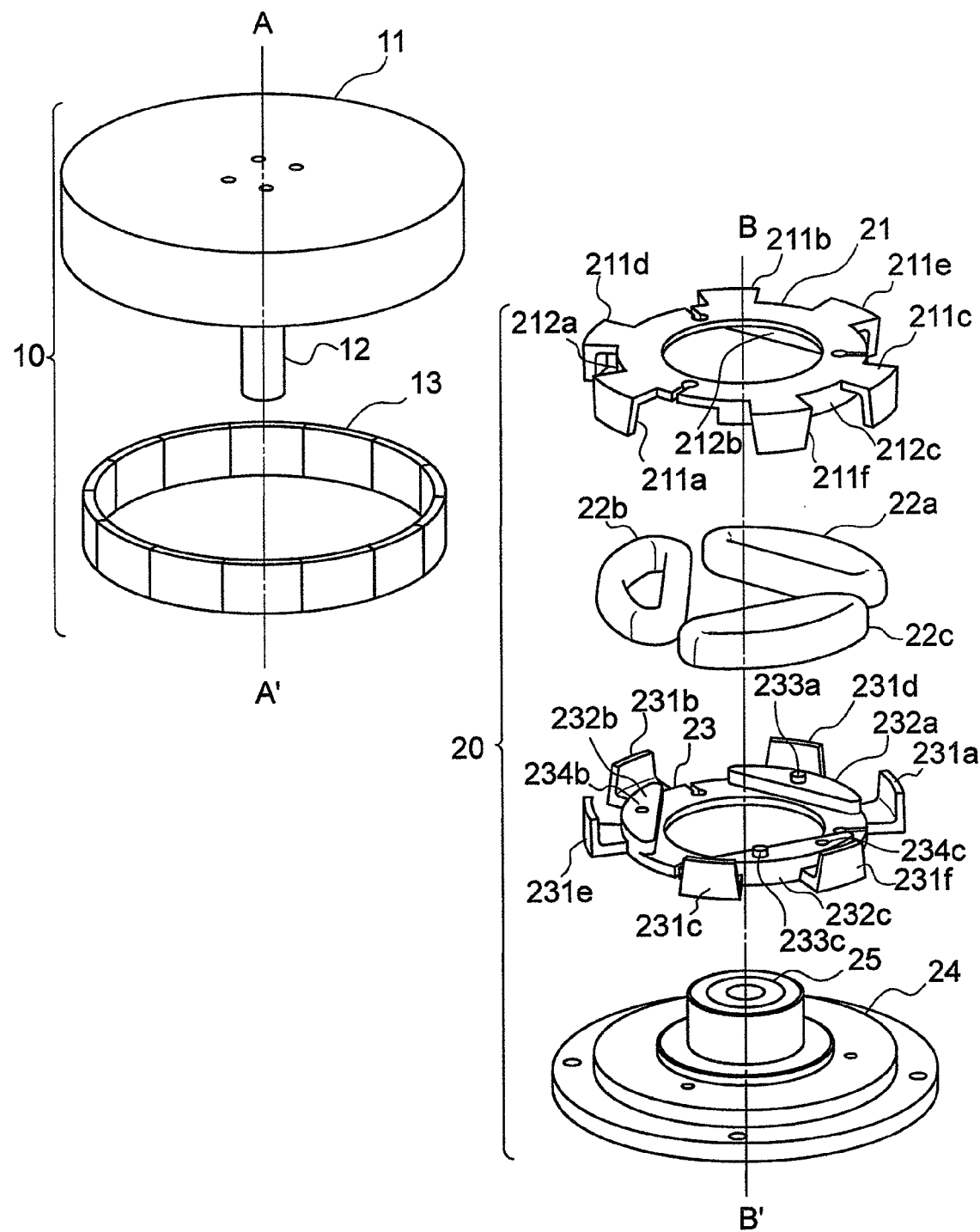
FIG. 1 is an exploded view of an outer rotor type three-phase motor which is characteristic of the present invention.

FIG. 1 shows an embodiment of an outer rotor type three-phase motor which is characteristic of the present invention, and is an exploded view in which a rotor 10 and a stator 20 constituting the motor are divided. The rotor 10 is composed of a rotary member 11 which transmits output power to a load, a cylindrical magnet 13 which is stuck to an inside of the rotary member 11 to generate magnetic flux, and a rotary shaft 12 which is the center of rotation. The rotor 10 is formed by incorporating the magnet 13 in the rotary member 11 integrated with the rotary shaft 12 with a center axis which is the straight line A-A' shown in FIG. 1.

The stator 20 is generally composed of a coil 22 which allows current to pass in the motor, stator cores 21 and 23 which form a magnetic path of magnetic flux generated by the current of the coil 22, a fixing member 24 for mounting the stator on a predetermined installation place, and a bearing 25 which supports the rotary shaft 12. The embodiment of FIG. 1 shows the case where the number of poles of the motor is 14, and the number of claw-type teeth of the stator is 12.

Figure 2:
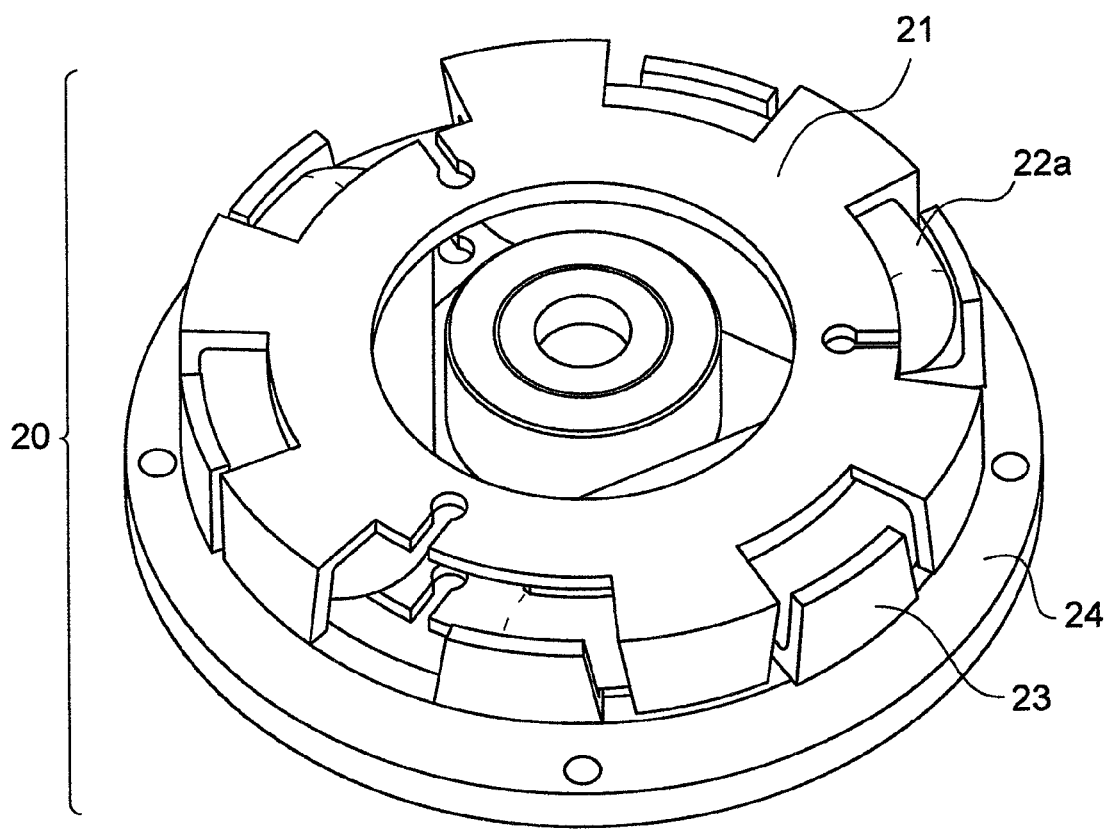
FIG. 2 is an exterior view of an assembled stator of the outer rotor type three-phase motor of FIG. 1.
Figure 3:
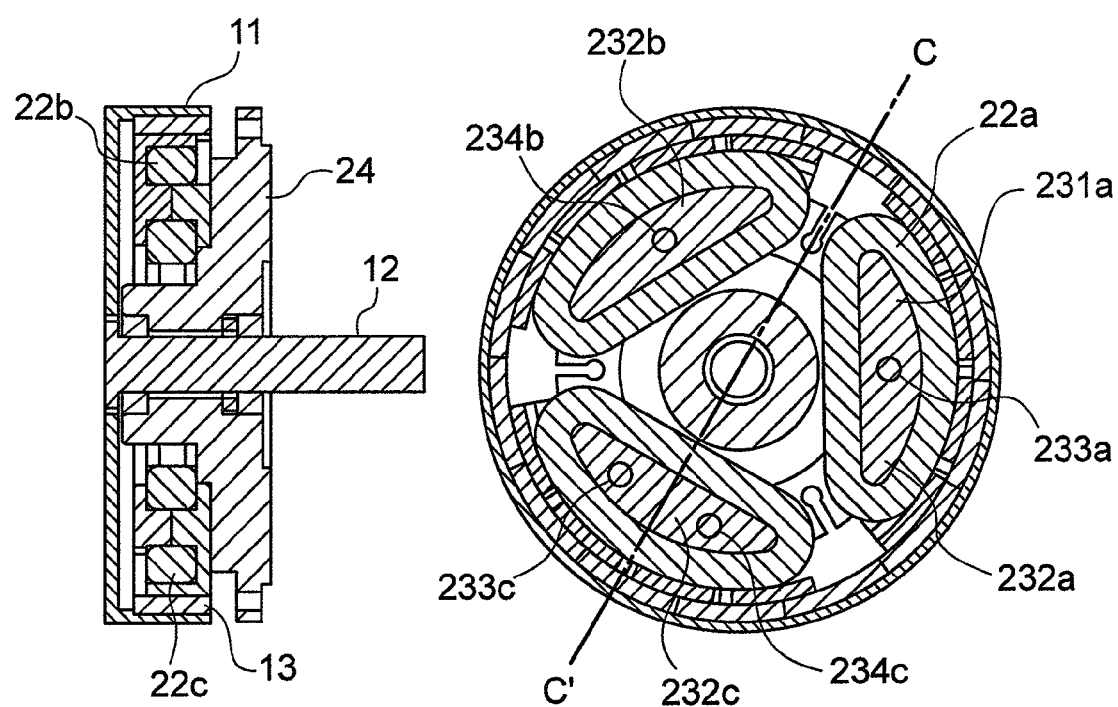
FIG. 3 is a sectional view of the outer rotor type three-phase motor of FIG. 1.

When assembling these components while setting the straight line B-B' in FIG. 1 to be a center axis, the stator 20 of the outer rotor type three-phase motor in the shape as shown in FIG. 2 is formed. By inserting the stator 20 which is assembled with the center axis of the straight line B-B' into the rotor 10 which is assembled with the center axis of the straight line A-A' in FIG. 1, the outer rotor type three-phase motor can be formed. FIG. 3 shows sectional views of the outer rotor type three-phase motor seen from a front and a side thereof.

In FIG. 1, the stator core 21 and the stator core 23 are the molded bodies having the same shape, and by opposing those to each other, claw-type teeth 211a to 211f of the stator core 21 and claw-type teeth 231a to 231f of the stator core 23 are alternately and mutually fitted between the other claw-type teeth. As shown in FIG. 2, it has a structure in which gaps exist between the claw-type teeth. The stator core 21 and the stator core 23 include columnar core portions 212a to 212c and 232a to 232c, respectively. Projected portions 213a and 233a are provided in central portions of the columnar core portions 212a and 232a, and recessed portions 214b and 234b are provided in central portions of the columnar core portions 212b and 232b. A projected portion 213c and a recessed portion 214c are provided in the columnar core portion 212c, and a projected portion 233c and a recessed portion 234c are provided in the columnar core portion 232c, respectively.

Next, the relationship of the projected portions and the recessed portions in the stator cores 21 and 23 will be described. A front sectional view is considered while the straight line C-C' shown in FIG. 3 is set to be a center axis. The projected portion 233a of the columnar core portion 232a and the recessed portion 234b of the columnar core portion 232b are disposed so as to be in the positional relation of the line symmetry with respect to the straight line C-C' as the center. The projected portion 233c and the recessed portion 234c of the columnar core portion 232c are also disposed to be linearly symmetrical with respect to the straight line C-C' as the center. By such disposition, the projected portion 213a of the stator core 21 and the recessed portion 234b of the stator core 23 are fitted to each other when the stator core 21 and the stator core 23 are opposed to each other. Similarly, the projected portion 213c, the recessed portions 214b and 214c of the stator core 21 are fitted to the recessed portion 234c and the projected portions 233a and 233c of the stator core 23, respectively. Thereby, there are provided the effects of being capable of assembling the stator core 21 and the stator core 23 easily with high accuracy and high strength, and of being capable of keeping uniformity of the motor characteristics.

The stator cores 21 and 23 may be formed into a simple shape with the projected portions 213c and 233c and the recessed portions 214c and 234c in the columnar core portions 212c and 232c of the stator cores 21 and 23 being removed, so that easiness of assembly and accuracy of assembly can be secured.

Figure 4:
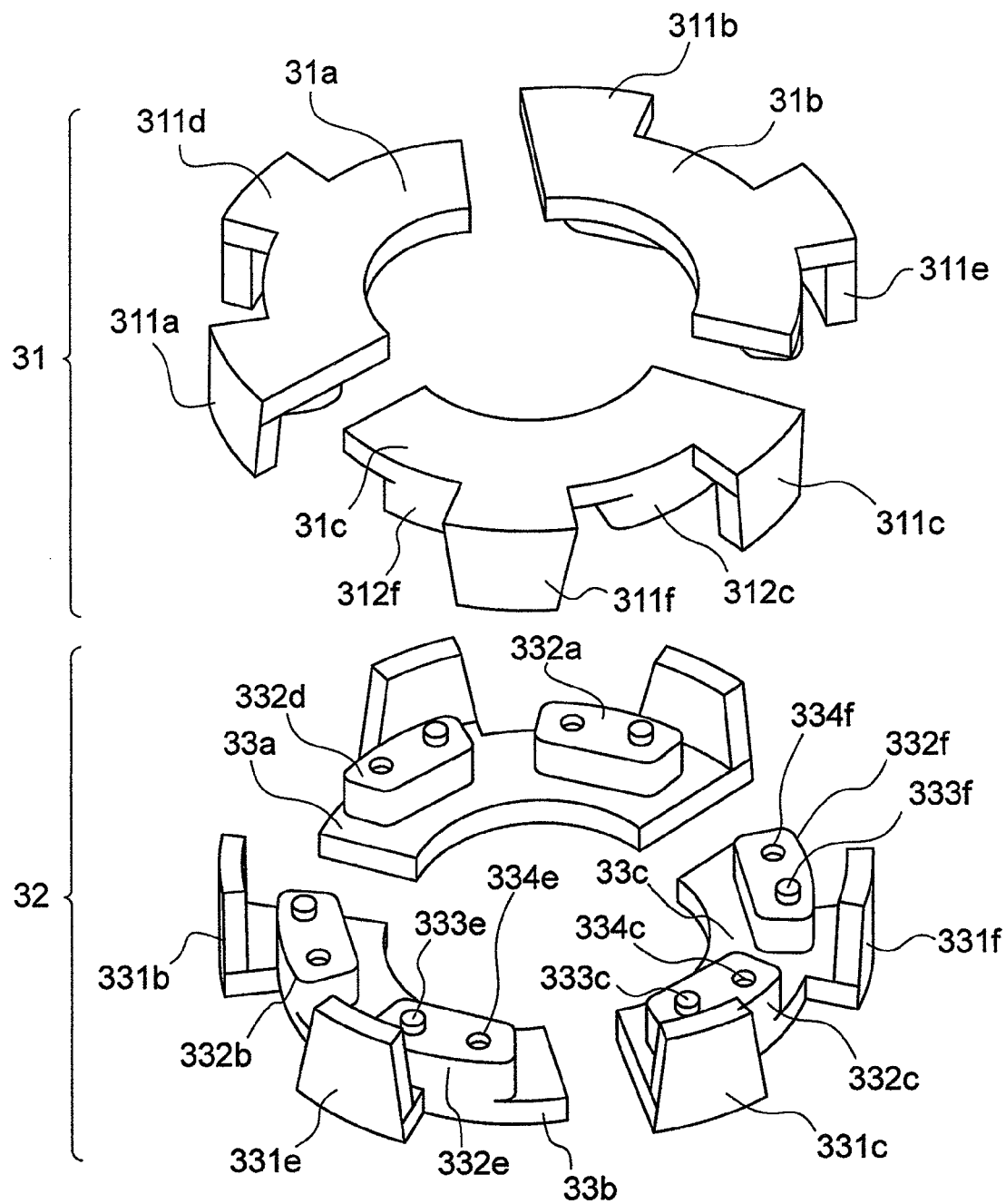
FIG. 4 is an exploded view of a stator of an outer rotor type three-phase motor having a six-split stator structure which is characteristic of the present invention, for showing another embodiment differing from that of FIG. 1.

FIG. 4 is another embodiment differing from that of FIG. 1, and is an example of an outer rotor type three-phase motor in which a stator 30 has a six-split structure. FIG. 4 is an exploded view in which the stator is disassembled. A stator core 31 corresponding to the stator core 21 of FIG. 1 is split into split cores 31a, 31b and 31c. Similarly, a stator core 33 corresponding to the stator core 23 of FIG. 1 is split into split cores 33a, 33b and 33c. These split cores are all of the same shape, and if those are integrally molded from a magnetic powder material, those can be manufactured at low cost. Each of the split cores has two columnar core portions, and each of the columnar core portions has one projected portion and one recessed portion. Here, a projected portion and a recessed portion of a columnar core portion 312c of the split core 31c can be fixed by being fitted to a recessed portion 334c and a projected portion 333c of a columnar core portion 332c of the split core 33c. Similarly, a projected portion and a recessed portion of a columnar core portion 312f can be fixed by being fitted to a recessed portion 334e and a projected portion 333e of a columnar core portion 332e of the split core 33b. In this way, the split cores 31a, 31b and 31c of the stator core 31 and the split cores 33a, 33b and 33c of the stator core 33 are alternately laid on one another in a brick laying form.

Figure 5:
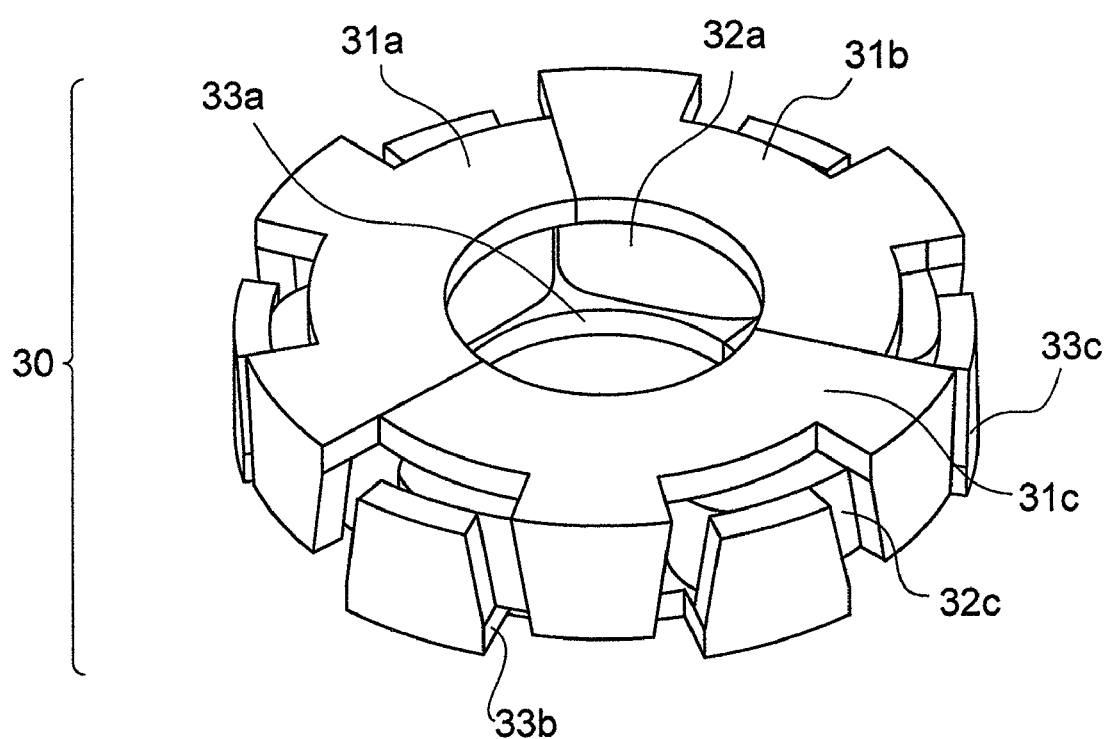
FIG. 5 is an exterior view of an assembled stator of the outer rotor type three-phase motor of FIG. 4.
Figure 6:
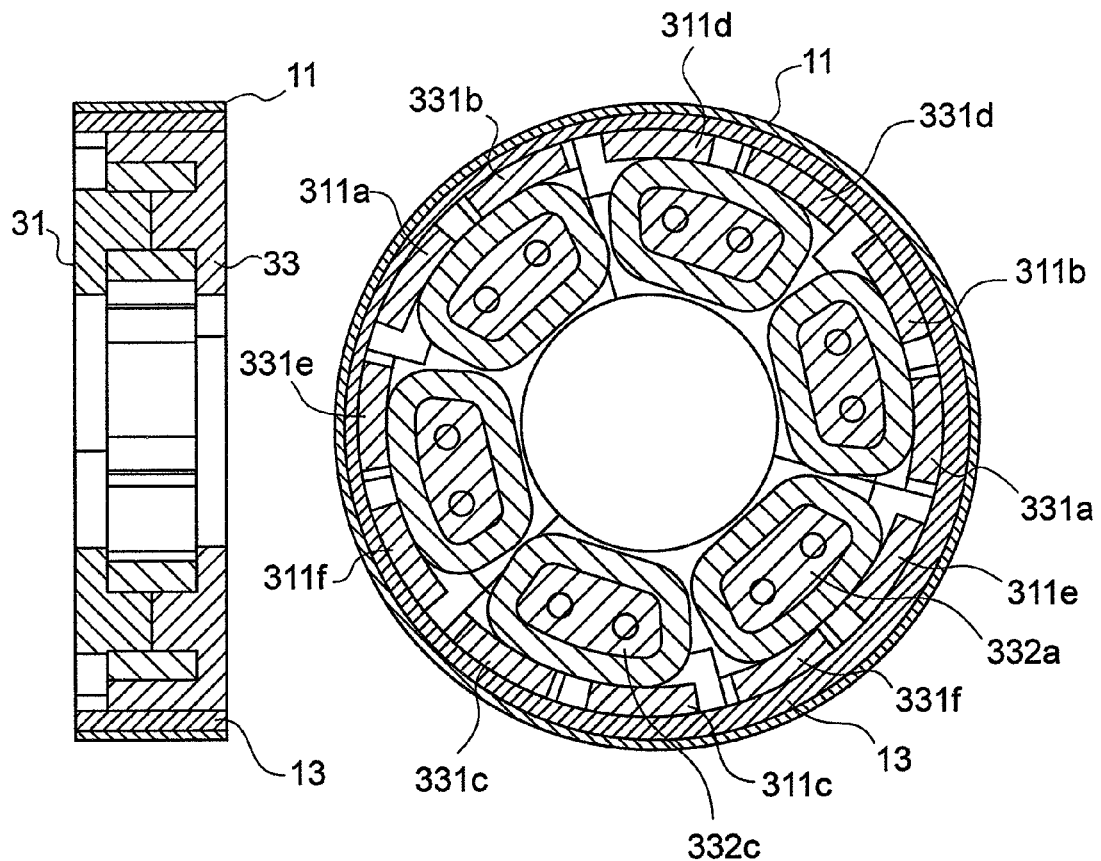
FIG. 6 is a sectional view of the outer rotor type three-phase motor of FIG. 4.

FIG. 5 is an exterior view when coils 32a to 32f are inserted into columnar core portions and the stator core of FIG. 4 is assembled. FIG. 6 shows a sectional view of an outer rotor type three-phase motor of a six-split structure including the rotor composed of the magnet 13 and the rotary member 11. The stator 30 can be easily assembled with high accuracy by firmly fitting at the columnar core portions, and by laying the split cores in the brick laying form, and therefore, cost reduction can be achieved.

Figure 7:
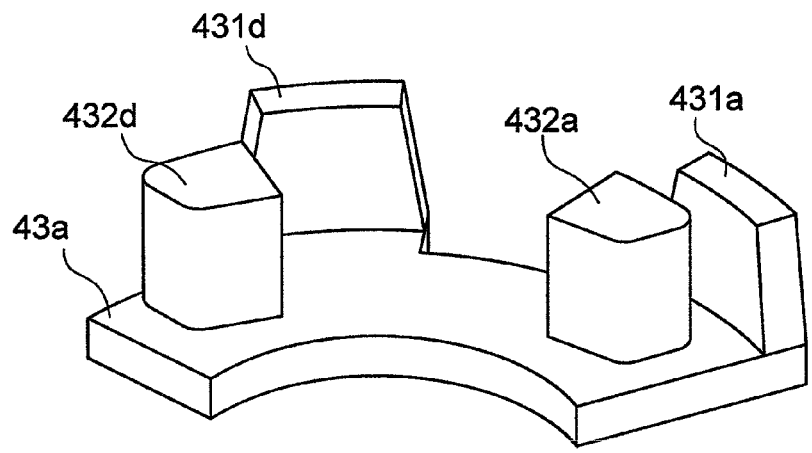
FIG. 7 is an exterior view of a split core used for the outer rotor type three-phase motor having the six-split stator structure which is characteristic of the present invention, which core differs from that of FIG. 4.

FIG. 7 is another embodiment of which fitting method is different from those of FIGS. 1 and 4. Instead of the split core 33a shown in FIG. 4, a split core 43a is used. The split core 43a has columnar core portions 432a and 432d, and has the characteristic that the structure including the claw-type teeth 431a and 431d is simple. Similarly to the embodiment of FIG. 4, six of the split cores of the same shape as the split core 43a shown in FIG. 7 are used in total and combined in the brick laying form, and thereby, a six-split structure outer rotor type motor shown in a sectional view of FIG. 8 can be constructed.

Figure 8:
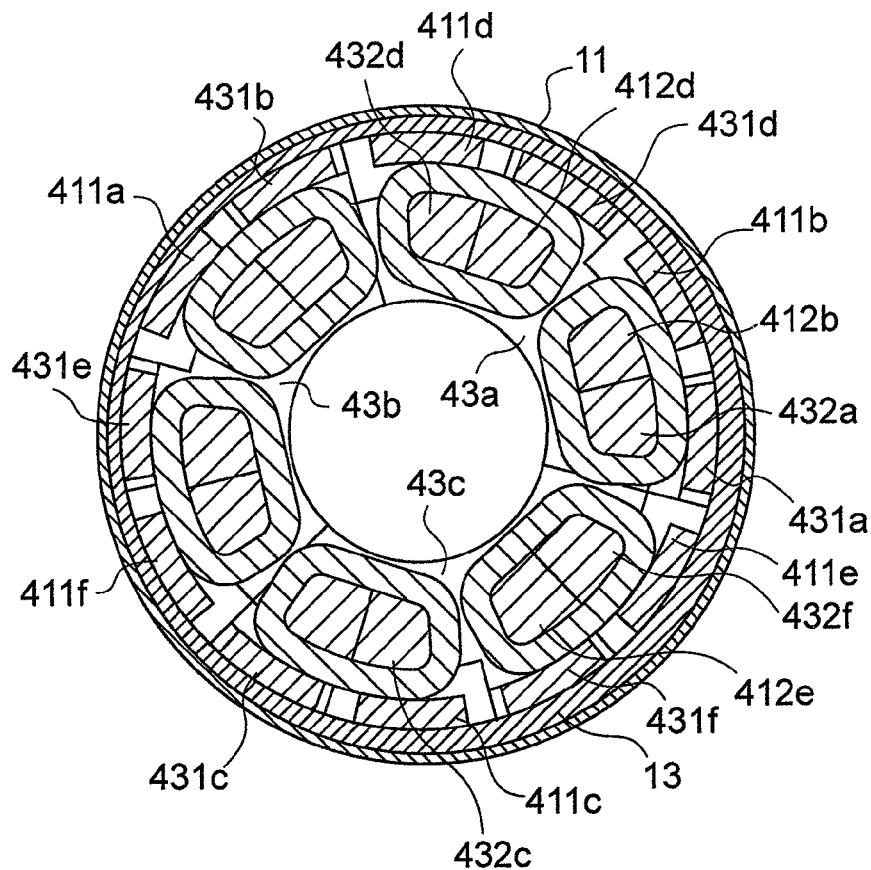
FIG. 8 is a top view of the outer rotor type three-phase motor assembled by using the six split cores shown in FIG. 7.

The shape of the split core of FIG. 7 may seem to have the structure which does not have a recessed portion at first glance, however, a space between the columnar core portions 432a and 432d which are projected portions forms a recessed portion. It may be considered that the core would come apart if only these split core members are used, however, firmly fitting the split cores by means of the shape of these split cores will be described hereinafter. In FIG. 8, a stator core 43 is composed of split cores 43a, 43b and 43c. The columnar core portion 432a of the split core is combined with a columnar core portion 412b of a split core 41b forming a part of a stator core 41 to constitute one columnar core portion. At the same time, another columnar core portion 412e of the split core 41b is combined with a columnar core portion 432f of the split core 43c to constitute another columnar core portion. As shown in FIG. 8, when the six-split cores are assembled in the brick laying form, the strength of the stator 40 can be kept with respect to a circumferential direction relative to the rotary shaft. In other word, by adopting the shape of the columnar core portion as shown in FIG. 7 and laying the split cores in the brick laying form, the fitting part can be provided. In the case of FIG. 7, the split core does not seem to have a recessed portion, but by a plurality of (two in this case) columnar core portions 432a and 432d, the effect of fixing the other split core is provided. Accordingly, in this embodiment, a mold for integrally molding a core can be formed with a simple shape, and therefore, this embodiment is effective for reducing the cost of the product.

Figure 9:
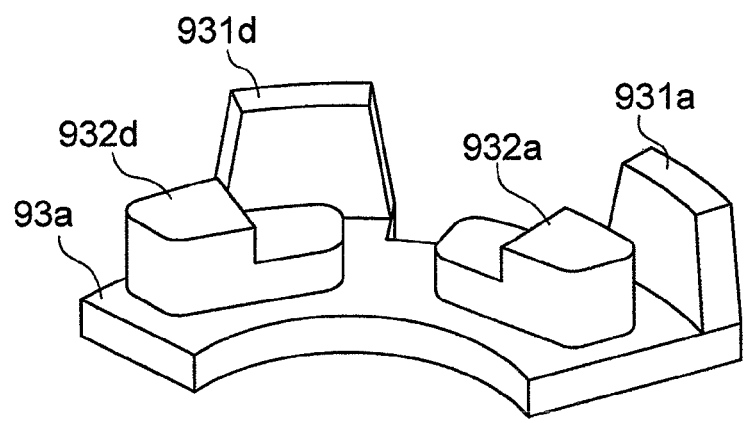
FIG. 9 is an exterior view of a split core used for the outer rotor type three-phase motor having the six-split stator structure which is characteristic of the present invention, which core differs from those of FIGS. 4 and 7.

An embodiment of FIG. 9 has the same concept as the embodiment in FIG. 7, though the shapes of columnar core portions 932a and 932d differ from those of the columnar core portions 432a and 432d of FIG. 7, and those can be easily fixed as a stator. That is, a space between the columnar core portions 932a and 932d becomes a recessed portion. Further, in this embodiment, the shape of a lower portion of the columnar core portion is substantially the same as the coil shape, and can facilitate positioning at the time of inserting a coil, and therefore, this embodiment has the effect of reducing the number of assembly process steps of a motor.

Figure 10:
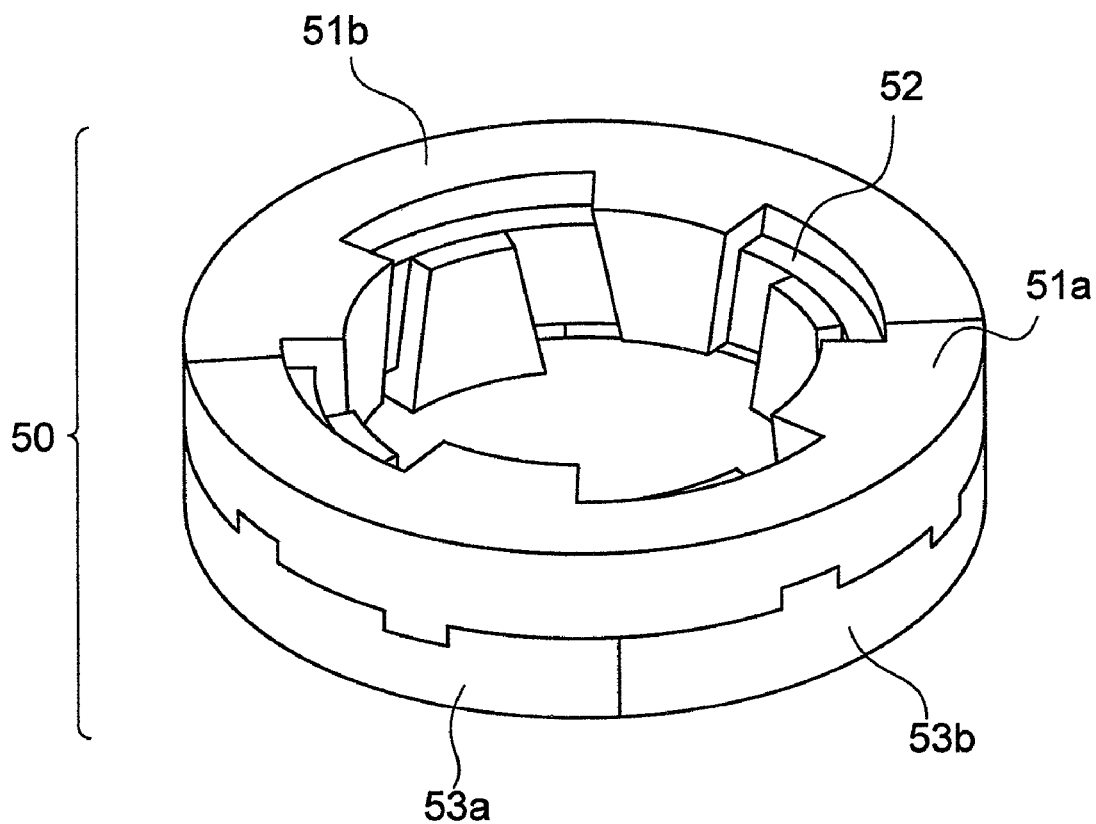
FIG. 10 is an exterior view of a stator for one phase of an inner rotor type three-phase motor which is characteristic of the present invention.
Figure 11:
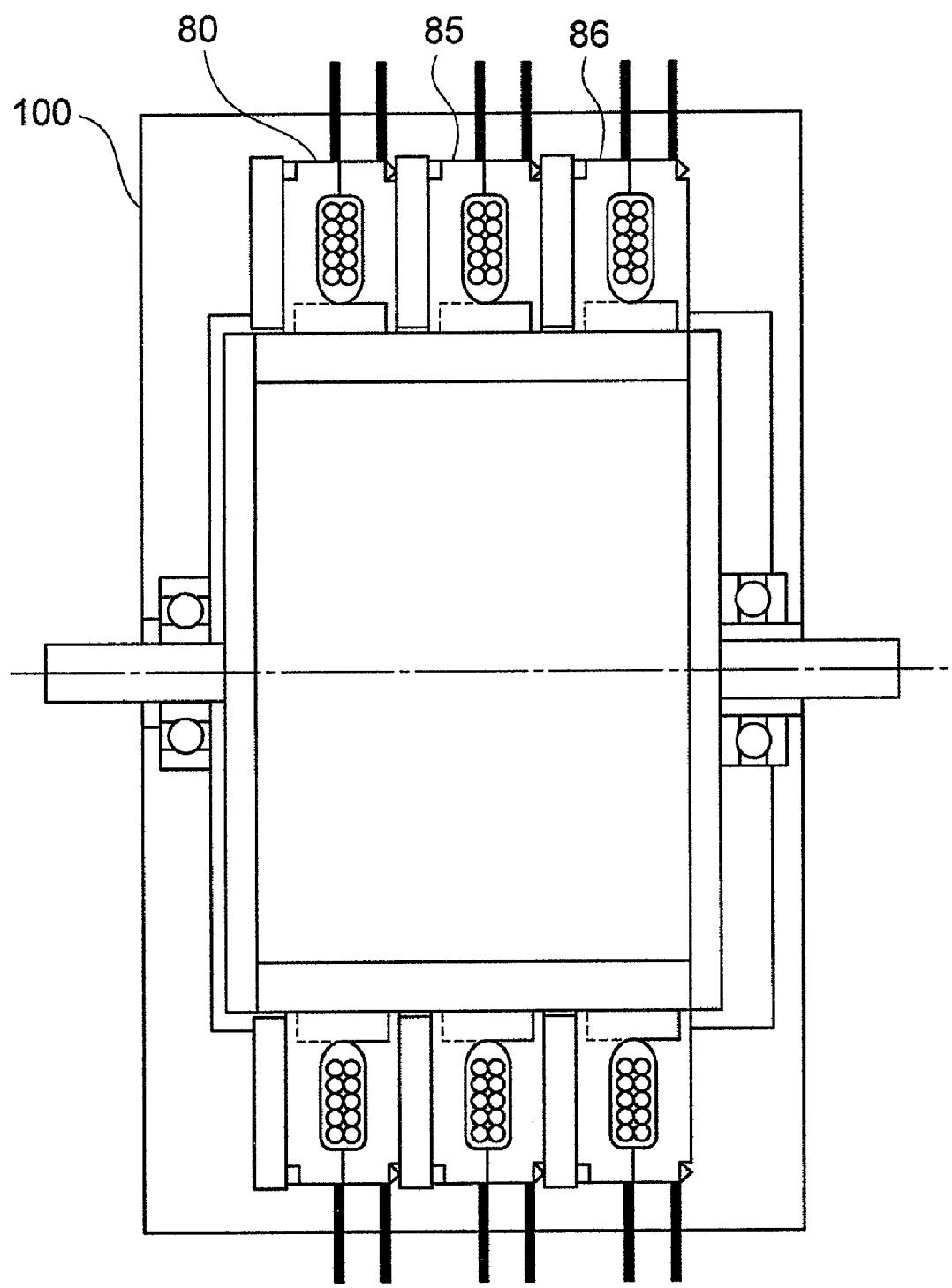
FIG. 11 is a sectional view of the inner rotor type three-phase motor constituted using three set of the stators each for one phase of FIG. 10.

FIG. 10 is an exterior view of a one-phase stator 50, which is an embodiment when applied to an inner rotor type three-phase motor, unlike the embodiments of FIGS. 1 to 9. The one-phase stator is composed of split cores 51a, 51b, 53a, and 53b, and a coil 52, and the four split cores have the same shape. A sectional view at the time of incorporating the one-phase stator 50 into a three-phase motor will become the sectional view as shown in FIG. 11 already described.

Figure 12:
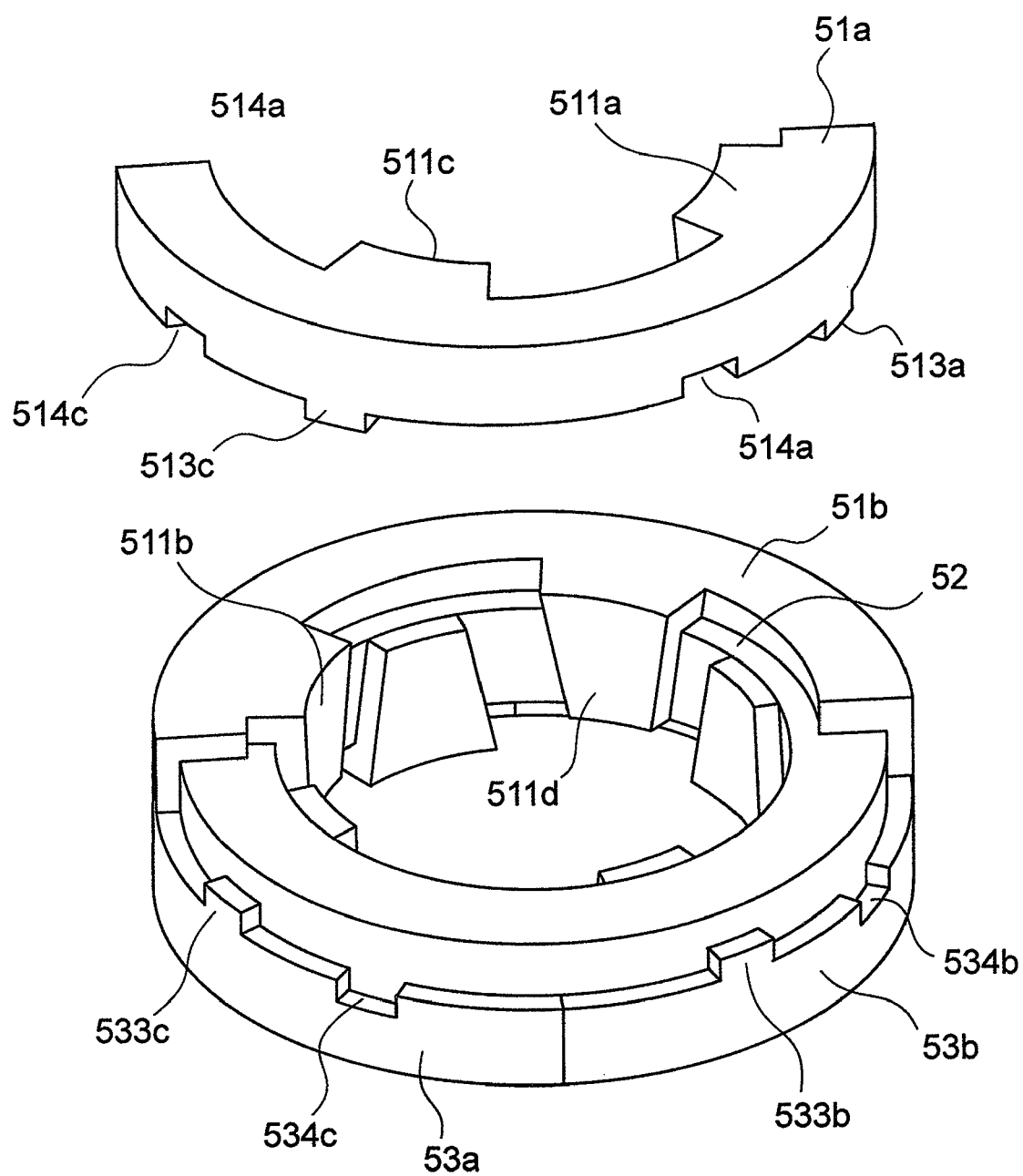
FIG. 12 is an exploded view in which only one split core is disassembled in the stator for one phase of the inner rotor type motor of FIG. 10.

FIG. 12 shows the one-phase stator of FIG. 10, but only the split core 51a is disassembled therein. The split core 51a includes claw-type teeth 511a and 511c, projected portions 513a and 513c, and recessed portions 514a and 514c. The projected portion 513a and the recessed portion 514a of the split core 51a are fitted to a recessed portion 534b and a projected portion 533a of the split core 53b, respectively. Similarly, a projected portion 513c and a recessed portion 514c of the split core 51a are fitted to a recessed portion 534c and a projected portion 533c of the split core 53a, and therefore, the one-phase stator can be fixed in spite of using the split cores.

Figure 13:
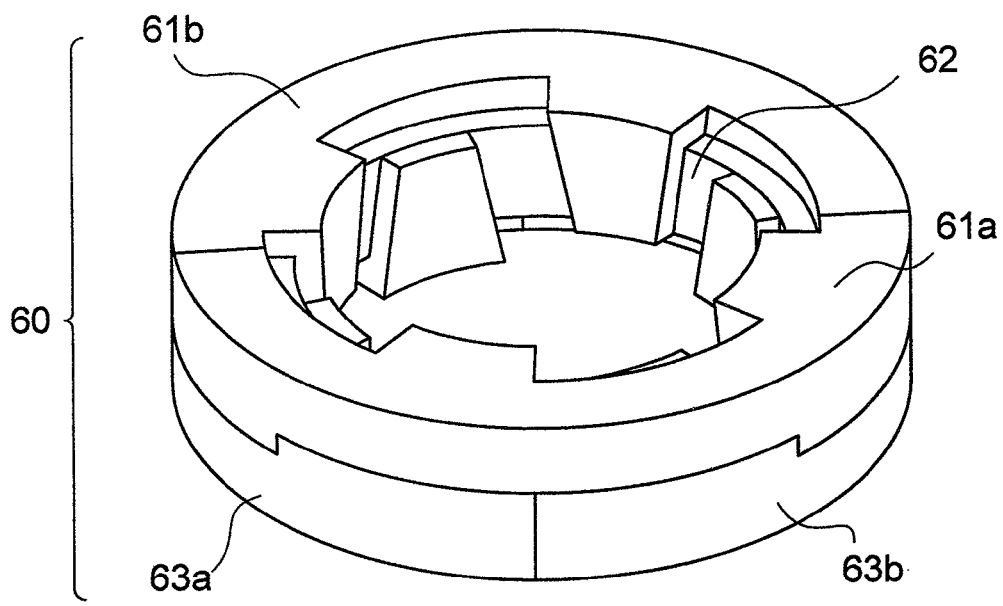
FIG. 13 is an exterior view of a stator for one phase of the inner rotor type three-phase motor which is characteristic of the present invention, for showing another embodiment differing from that of FIG. 10.
Figure 14:
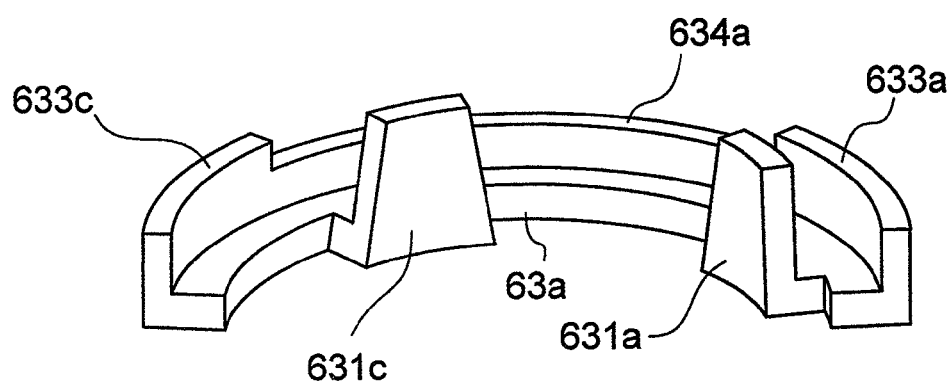
FIG. 14 is an exterior view of a split core in the embodiment of FIG. 12.

FIG. 13 is an exterior view of a one-phase stator 60 in the case that the number of recessed portions of the split core is one, which is another embodiment different from that of FIG. 10. FIG. 14 is an exterior view of a split core 63a of FIG. 13, and the split core 63a includes projected portions 633a and 633c and a recessed portion 634a in an outer circumferential part. Each one of the projected portions of each of the split cores 61a and 61b is inserted in the recessed portion 634a, and thereby, the split cores are firmly fitted as a one-phase stator. By using this embodiment, it is possible to manufacture a motor excellent in assembling facility and in assembling accuracy with a simple shape, and therefore, a motor with good quality can be provided at low cost.

Figure 15:
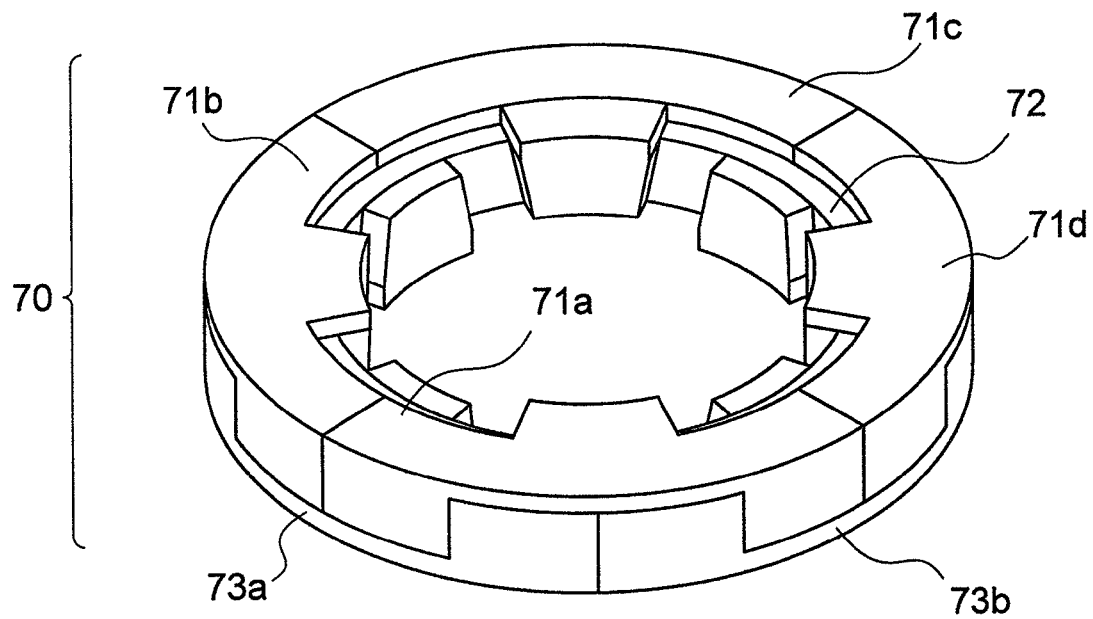
FIG. 15 is an exterior view of a stator core of the inner rotor type three-phase motor which is characteristic of the present invention, for showing another embodiment differing from those of FIGS. 10 and 13.
Figure 16:
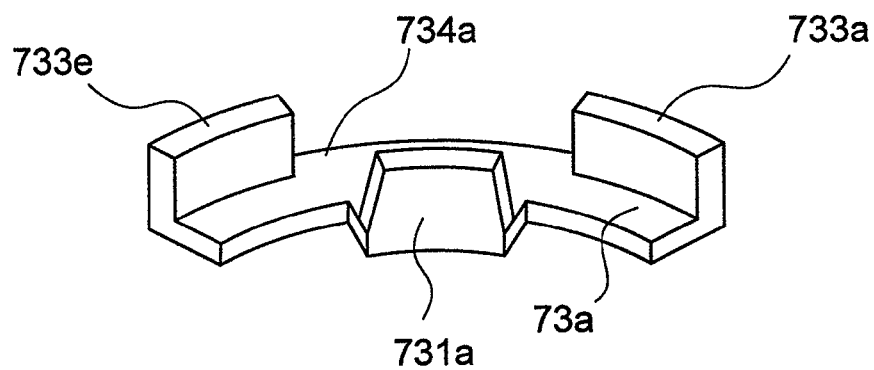
FIG. 16 is an exterior view of a split core in the inner rotor type three-phase motor of FIG. 15.
Figure 17:
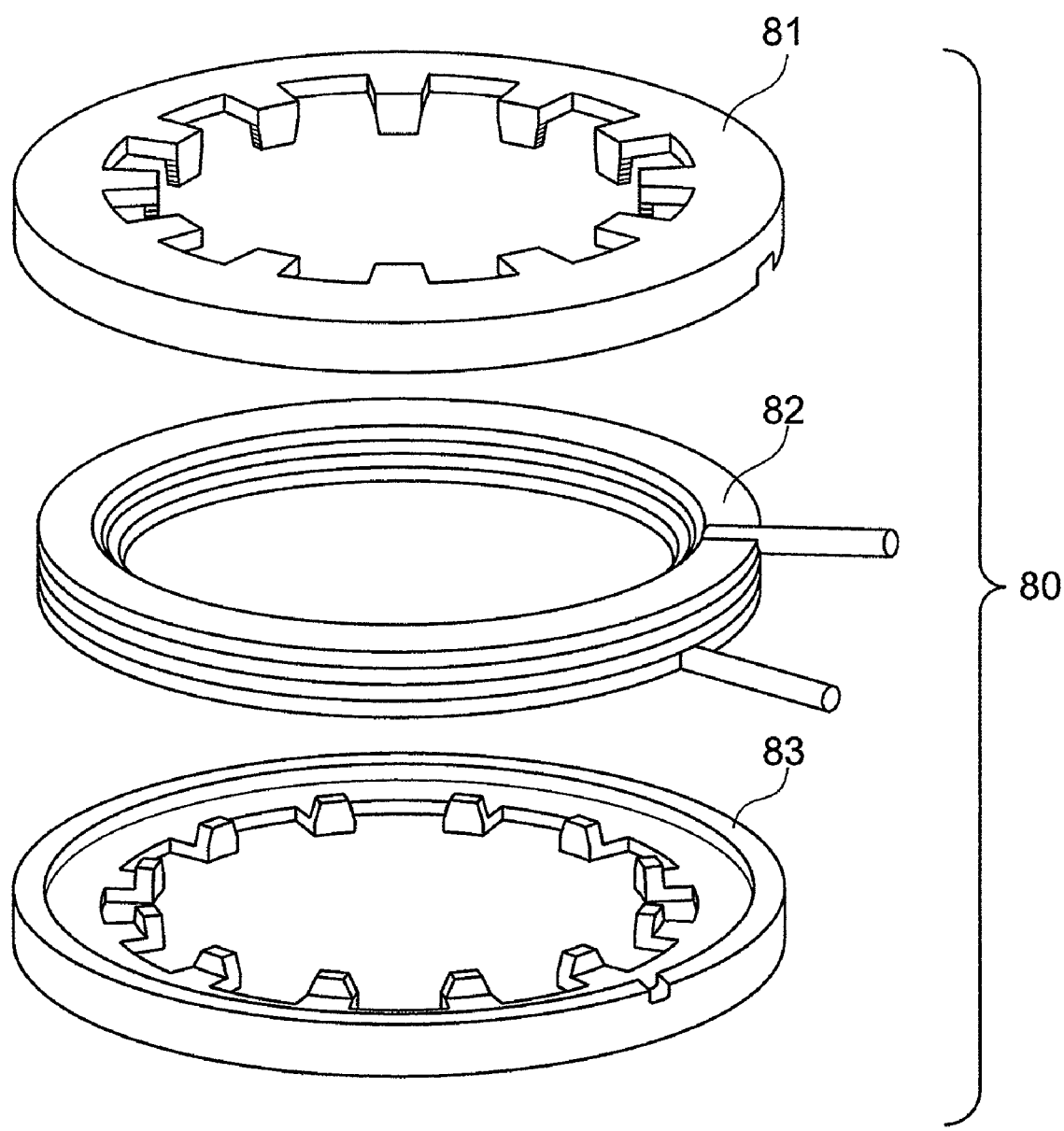
FIG. 17 is an exploded view of a stator for one phase of an inner rotor type three-phase motor having claw-type teeth, for explaining the embodiments of the present invention.

FIG. 15 is an exterior view of a one-phase stator 70, which is an embodiment in the case that the number of split cores is eight unlike those of FIGS. 10 and 13. In FIG. 15, the number of split cores is the same as the number of teeth. FIG. 16 is an exterior view showing the shape of a split core 73a in FIG. 15, and it includes a claw-type tooth 731a, projected portions 733a and 733e and a recessed portion 734a. The stator has the structure in which the center of the claw-type tooth 731a substantially corresponds to the center of the recessed portion 734a when seeing the direction of the circumference from the rotary shaft. Thereby, when the eight split cores are fitted to one another, the distances between the claw-type teeth become substantially uniform, so that the characteristic of being capable of generating large torque with a small body size motor is provided. Further, the effects that the shape of the split core is simple and the mold is easily produced are provided.

Figure 18:
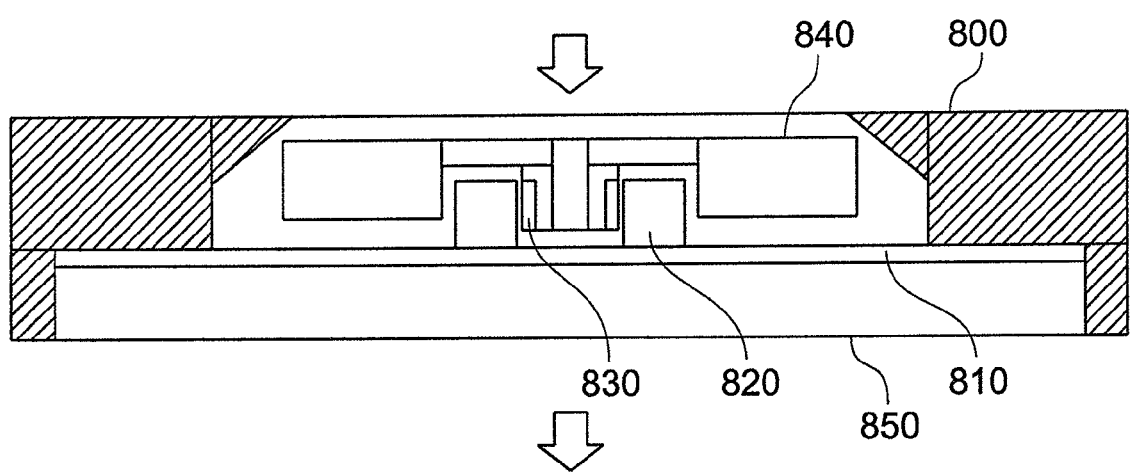
FIG. 18 is a sectional view of a fan device using a motor of an embodiment of the present invention.

Next, a fan device to which the motor of the above described embodiment is attached is shown in FIG. 18.

In FIG. 18, a stator 820 of the motor is mounted to a motor fixing member 810 fixed to a fan frame 800. A rotor blade 840 is mounted to a rotor 830, and rotates together with the rotor 830.

The structure is made so that when the rotor blade 840 rotates, atmosphere such as air or fluid flows from an upper part to a lower part in FIG. 18.

The structure is made so that a filter 850 for removing substances such as powder dust and dust which are contained in the atmosphere such as air or fluid and flow together therewith is fitted to a lower part of the fan device.

In the fan device of FIG. 18, by using the motor of the above described embodiments, reduction in thickness can be relatively easily achieved as compared with a conventional fan even if it becomes larger in size than the conventional one.

The embodiments applied to the three-phase motor are described in the above described embodiments, but it goes without saying that the present invention can be applied to a two-phase motor and a multiple-phase motor. The case that the shape of the recessed portion and the projected portion is rectangular is described in the above, but as a matter of course, the structure in which fitting is achieved by trapezoidal recessed portions and projected portions may be adopted. The number of poles of the motor, the number of teeth, and the number of splits of the stator core are not limited, and the present invention can be widely applied.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor, comprising:
a rotor which rotates around a rotary shaft; and
a first stator core in which a plurality of first columnar core portions and a plurality of claw-type teeth are arranged on circles, respectively, the centers of the circles being the rotary shaft; and
a second stator core in which a plurality of second columnar core portions and a plurality of claw-type teeth are arranged on circles, respectively, the center of the circles being the rotary shaft, wherein
the motor comprises a stator in which the first stator core and the second stator core are opposed so that the first and second columnar core portions overlap each other, and in which a coil is provided at each of the overlapping columnar core portions, wherein
the first and the second stator cores comprise a recessed portion in at least one of the columnar core portions, and a projected portion in at least one of the columnar core portions, the projected portion being adapted to be fitted in the recessed portion.

2. A motor, comprising:
a rotor which rotates around a rotary shaft;
a first stator core in which a plurality of first columnar core portions and a plurality of claw-type teeth are arranged on circles, respectively, the centers of the circles being the rotary shaft; and
a second stator core in which a plurality of second columnar core portions and a plurality of claw-type teeth are arranged on circles, respectively, the center of the circles being the rotary shaft, wherein
the motor comprises a stator in which the first stator core and the second stator core are opposed so that the first and second columnar core portions overlap each other, and in which a coil is provided at each of the overlapping columnar core portions, wherein
the first and the second stator cores comprise a plurality of split cores having the same shape, and the split core comprises a plurality of the columnar core portions and has a fitting part for laying the opposing split cores on each other in an alternate brick laying form.

3. The motor according to claim 2, wherein the fitting part includes a recessed portion and a projected portion.

4. The motor according to claim 2, wherein the number of columnar portions per the split core is an even number.

5. A motor comprising
a rotor which rotates around a rotary shaft; and
a stator formed by opposing a plurality of stator cores to each other, the stator core comprising a columnar core portion on which a plurality of coils arranged on the same plane around the rotary shaft are disposed and claw-type teeth, wherein
the stator core comprises a recessed portion in at least one columnar core portion, and a projected portion in at least one columnar core portion, the projected portion being adapted to be fitted in the recessed portion.

6. The motor according to claim 5, wherein the split core is molded by compression-molding a powder iron core.

7. A fan device comprising:
the motor according to any one of claim 5;
a rotor blade mounted to the rotor of the motor;
a filter for removing a substance included in fluid flowing in a rotary shaft direction of the motor by rotation of the rotor blade;
a motor fixing member on which the stator of the motor is mounted; and
a fan frame for supporting the filter and the motor fixing member.

8. A motor comprising
a stator including a plurality of one-phase stators, the one-phase stator including a pair of stator cores having claw-type teeth and a coil generating magnetic flux at the claw-type teeth; and
a rotor which generates torque at a rotary shaft, wherein
the stator core is divided into a plurality of split cores having the same shape, and the split core includes a recessed portion and a projected portion which is adapted to be fitted in the recessed portion.

9. The motor according to claim 8, wherein a line connecting a center of the claw-type tooth and a center of the recessed portion is in a direction toward the rotary shaft.

10. The motor according to claim 8, wherein the stator is formed by inserting the projected portions of a plurality of the split cores constituting one stator core into the recessed portion of the split cores constituting the other stator core to be paired with the one stator core.

11. The motor according to claim 8, wherein the split cores constituting one stator core and the split cores constituting the other stator core to be paired with the one stator core are laid on one another in an alternate brick laying form.

12. A motor comprising
a stator including a plurality of one-phase stators, the one-phase stator including a pair of stator cores having claw-type teeth and a coil generating magnetic flux at the claw-type teeth; and
a rotor which generates torque at a rotary shaft, wherein
the stator core comprises a plurality of split cores having the same shape, and the split core includes at least one recessed portion, and a plurality of projected portions.

13. The motor according to claim 12, wherein the projected portion is disposed in an end portion of the split core, and the recessed portion is disposed in a substantially central portion of the split core.

* * * * *